(Model.)
P. PFEIL.
DETACHABLE STRAINER.
No. 405,373. Patented June 18, 1889.
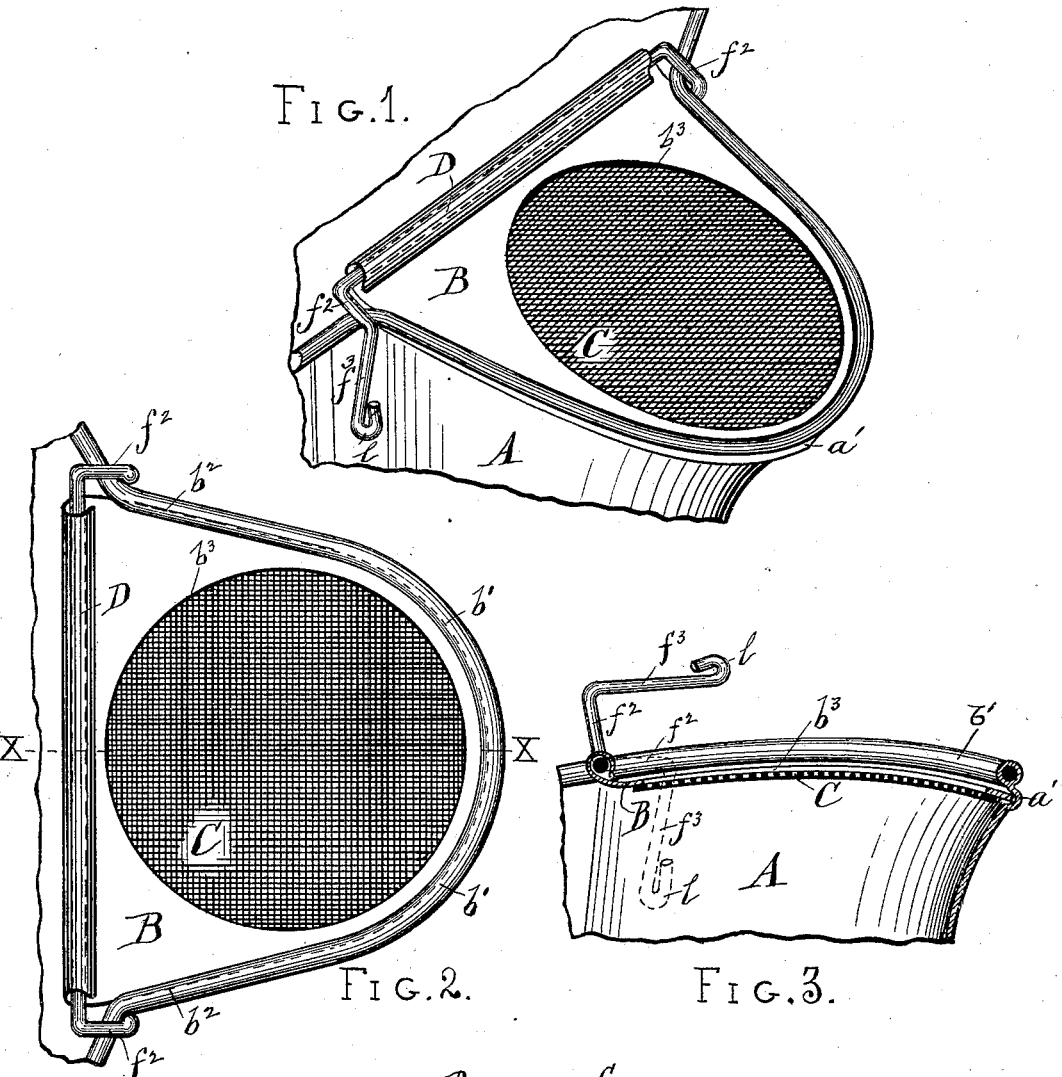
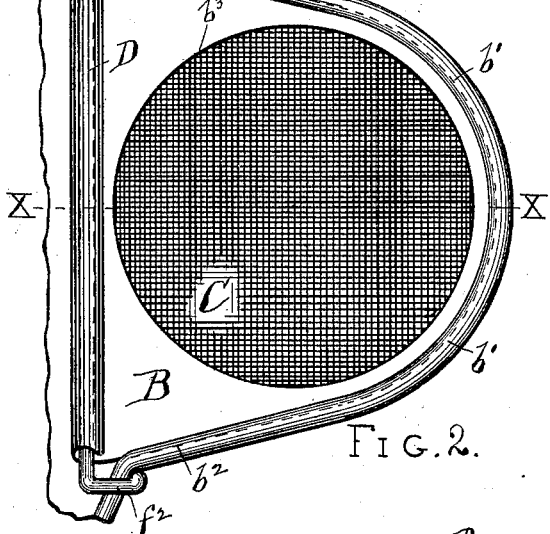
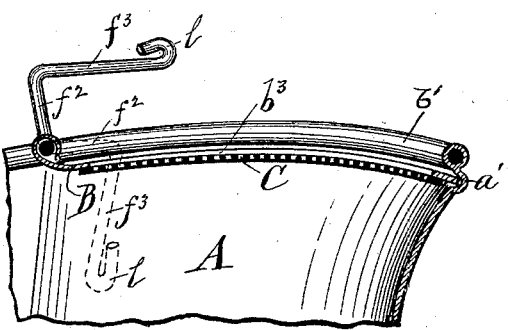
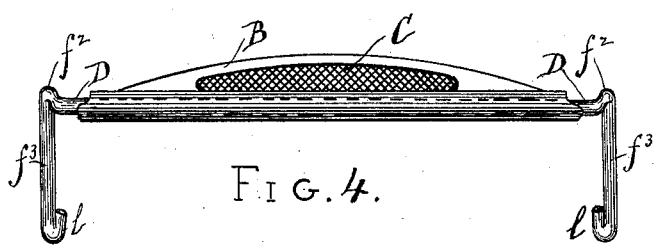
Witnesses.
George Brandon
Charles Herthel.
Inventor.
Philip Pfeil.
By his Attorneys Herthel & Co.

United States Patent Office.

PHILIP PFEIL, OF ST. LOUIS, MISSOURI, ASSIGNOR OF ONE-HALF TO GEORGE BRANDON, OF SAME PLACE.

DETACHABLE STRAINER.

SPECIFICATION forming part of Letters Patent No. 405,373, dated June 18, 1889.

Application filed January 21, 1889. Serial No. 297,076. (Model.)

*To all whom it may concern:*

Be it known that I, PHILIP PFEIL, a citizen of the United States, residing at St. Louis, and State of Missouri, have invented a new and useful Improved Detachable Strainer, of which the following is a specification.

My invention relates to a detachable strainer, specially applicable to the spouts of milk-buckets or other vessels for the purpose of straining their liquids; and it consists of a tin-metal lip or stopper of shape and size to fit the spout of a vessel having a circular opening, and to which circular opening and on the under side of said tin-metal lip or stopper the wire-cloth strainer proper is applied and soldered, the said tin-metal lip or stopper when inserted fitting into a crease formed under the rim of the spout, so as to prevent leakage, and also being provided with a reversible wire fastener, by means of which the same is fastened to the spout of the vessel, as will be more fully described.

The object of my invention is to provide a strainer which can be applied and fastened to the spouts of milk-buckets or other vessels for the purpose of straining their liquids, and also detached therefrom, so that the said vessels may be used for other purposes; also, in providing my detachable strainer with a reversible wire fastener having crooked wire clamps at the ends, by means of which it can be securely fastened or clamped to the spout of the vessel when inserted into the crease of the spout, and also released from the same. I attain these objects by the mechanism illustrated in the accompanying drawings, of which—

Figure 1 is a perspective view of my detachable strainer as applied and clamped to the spout of a vessel ready for use. Fig. 2 is a top view showing same inserted in the spout of a vessel and fastened or clamped to same. Fig. 3 is a sectional elevation on line X X of Fig. 2. Fig. 4 is a front end view to better show the wire fastener.

Similar letters refer to similar parts throughout the several views.

A represents the spout of the vessel.
B represents the tin-metal lip or stopper.
C represents the wire-cloth strainer proper, and D the reversible wire fastener.

The spout A is of the usual shape and construction, except that I provide the same with a crease immediately under the rim of the spout, as shown at $a'$, Fig. 3, for the purpose of receiving the edge of the tin-metal lip or stopper B, so as to prevent leakage.

The tin-metal lip or stopper B, I provide with a circular opening $b^3$, for the purpose of receiving the wire-cloth strainer proper C, which I apply and solder to the under side of the same, so as to cover said opening $b^3$, (see Fig. 3,) and make said tin-metal lip or stopper B of a shape and size to fit the crease $a'$ of spout A and also project slightly inward in the vessel for the purpose of providing for the attachment of my reversible wire fastener D, the edge $b'$ of the tin-metal lip or stopper B, as shown in dotted lines, (see Fig. 2) having a convex shape, so as to fit the concave form of the inner surface of the spout A and the edges $b^2 \, b^2$, (see Fig. 2,) each having a converging outward shape, so as to conform to the convergent ends of said spout A, where they join the sides of the vessel, so that when said tin-metal lip or stopper B is inserted in the crease $a'$ (see Fig. 3) of said spout A it effectually closes the same to the passage of the liquid to be strained except through the wire-cloth strainer proper C as applied to the circular opening $b^3$. To fasten said tin-metal lip or stopper B (to which is attached the wire-cloth strainer proper C, as has been described, and which constitutes my detachable strainer) to the spout A, I provide the said tin-metal lip or stopper B at its convergent end with my wire fastener D and provide said wire fastener D at both ends with the crooked wire clamps $f^2 \, f^3$ and terminating crook $l$. (See Figs. 1, 3.) Said wire fastener D, I make out of a stout piece of wire and insert and secure same by the turned-over edge of the tin-metal lip or stopper B, so as to be held therein loosely and be reversible, (see Fig. 3,) said crooked wire clamps $f^2 \, f^3$ being formed by a continuation of said wire at both sides of said tin-metal lip or stopper B by bending and projecting the said wire first outwardly, as shown in Fig. 2 and in dotted lines in Fig. 3, and then downwardly by bending the wire at right angles to said outwardly-projected wire, and finally terminating in crook $l$.

The operation of my wire fastener is as follows: To fasten my detachable strainer to the spout A when inserted in crease $a'$ of spout A, I reverse and project the wire clamps $f^2 f^3$ forward, as shown in Fig. 3, and then firmly press them down by means of the thumbs of the two hands, so that the downwardly-projected wire $f^3$ of said wire clamp securely clamps the sides of the spout A, as shown in Figs. 1, 2. To release the same, the index-fingers of the two hands are inserted under the crook $l$ of the downwardly-projected wire $f^3$ of the wire clamp and then raised, thereby pressing the same first outwardly and then upwardly.

Having described my invention, I will now explain its advantages.

As my detachable strainer is not attached to the vessel, but forms a separate article, it permits the packing of milk-buckets or other vessels in a very compact form, thereby saving cost in shipment, as said vessels may be placed one within the other, or nested, which cannot be done with the old-style vessels as heretofore manufactured provided with a guard and having the straining appliance attached to the spout. Further, it permits a a ready cleaning of the wire-cloth strainer when clogged by constant use.

What I claim, and desire to secure by Letters Patent, is—

In a detachable strainer, the tin-metal lip or stopper B, having the opening $b^3$ and wire-cloth strainer proper C, soldered to the under side of said tin-metal lip or stopper B, in combination with the reversible wire fastener D, having crooked wire clamps $f^2 f^3$ and terminating crook $l$, by means of which the same can be fastened or clamped to the spout A when inserted in crease $a'$ of spout A, and also released from the same, as and for the purpose set forth.

PHILIP PFEIL.

Witnesses:
JOHN W. HERTHEL,
GEORGE BRANDON.